United States Patent
Fevre et al.

(10) Patent No.: US 10,035,655 B2
(45) Date of Patent: Jul. 31, 2018

(54) BRUSH CONVEYOR FOR TRANSPORTING PREFORMS

(71) Applicant: SIDEL PARTICIPATIONS, Octeville-sur-Mer (FR)

(72) Inventors: Sebastien Fevre, Octeville-sur-Mer (FR); Rui De Lima, Octeville-sur-Mer (FR); Denis Turlotte, Octeville-sur-Mer (FR); Frederic Willig, Octeville-sur-Mer (FR)

(73) Assignee: SIDEL PARTICIPATIONS, Octeville-Sur-Mer (FR)

( * ) Notice: Subject to any disclaimer, the term of this patent is extended or adjusted under 35 U.S.C. 154(b) by 0 days.

(21) Appl. No.: 15/525,420

(22) PCT Filed: Nov. 4, 2015

(86) PCT No.: PCT/FR2015/052978
§ 371 (c)(1),
(2) Date: May 9, 2017

(87) PCT Pub. No.: WO2016/075389
PCT Pub. Date: May 19, 2016

(65) Prior Publication Data
US 2017/0320670 A1 Nov. 9, 2017

(30) Foreign Application Priority Data
Nov. 10, 2014 (FR) .................................. 14 60870

(51) Int. Cl.
B65G 15/14 (2006.01)
B65G 15/10 (2006.01)
(Continued)

(52) U.S. Cl.
CPC ........... *B65G 15/14* (2013.01); *B65G 15/105* (2013.01); *B65G 15/60* (2013.01); *B65G 51/035* (2013.01);
(Continued)

(58) Field of Classification Search
CPC ...... B65G 37/005; B65G 37/00; B65G 17/26; B65G 17/34; B65G 15/14; B65G 15/16
(Continued)

(56) References Cited

U.S. PATENT DOCUMENTS 4,026,406 A * 5/1977 Gazzarini .............. A21C 15/00
198/418.2
4,902,184 A * 2/1990 Fritz ....................... B65G 57/14
198/626.1
(Continued)

FOREIGN PATENT DOCUMENTS

EP 0 805 117 A2 11/1997
EP 1 291 304 A1 3/2003
(Continued)

OTHER PUBLICATIONS

International Search Report, dated Mar. 1, 2016, from corresponding PCT application.

*Primary Examiner* — James R Bidwell
(74) *Attorney, Agent, or Firm* — Young & Thompson

(57) ABSTRACT

Disclosed is a device for transporting plastic-container preforms, the device including an endless circulating element having an outer surface and being capable of moving the preforms along a path by rubbing against the preforms, the device including a stationary mounting defining a planar bearing surface for the preforms, the circulating element having a series of brushes which extend projecting from the outer surface, capable of engaging with the preforms in order to move same by rubbing.

21 Claims, 7 Drawing Sheets

(51) Int. Cl.
*B65G 15/60* (2006.01)
*B65G 51/03* (2006.01)
*B65G 19/02* (2006.01)
*B65G 15/26* (2006.01)

(52) U.S. Cl.
CPC ............ *B65G 15/26* (2013.01); *B65G 19/025* (2013.01); *B65G 2201/00* (2013.01); *B65G 2207/42* (2013.01)

(58) Field of Classification Search
USPC ................ 198/465.4, 466.1, 604, 606, 626.1
See application file for complete search history.

(56) References Cited

U.S. PATENT DOCUMENTS

| | | | | |
|---|---|---|---|---|
| 5,950,804 A * | 9/1999 | Farkas | ................... | B65G 15/14 198/626.1 |
| 6,488,449 B1 * | 12/2002 | Laquay | ................ | B65G 51/035 198/465.4 |
| 6,494,310 B1 * | 12/2002 | Furter | ................... | B65B 35/243 198/606 |
| 8,967,360 B2 * | 3/2015 | Tanner | ................. | B65G 11/023 193/2 R |
| 2012/0312661 A1 | 12/2012 | Bianchini | | |

FOREIGN PATENT DOCUMENTS

| | | | | |
|---|---|---|---|---|
| FR | 2 956 652 A1 | 8/2011 | | |
| WO | 97/10163 | * | 3/1997 | ............. B65G 15/14 |
| WO | 97/10163 A1 | 3/1997 | | |
| WO | 2014/076450 A1 | 5/2014 | | |

* cited by examiner

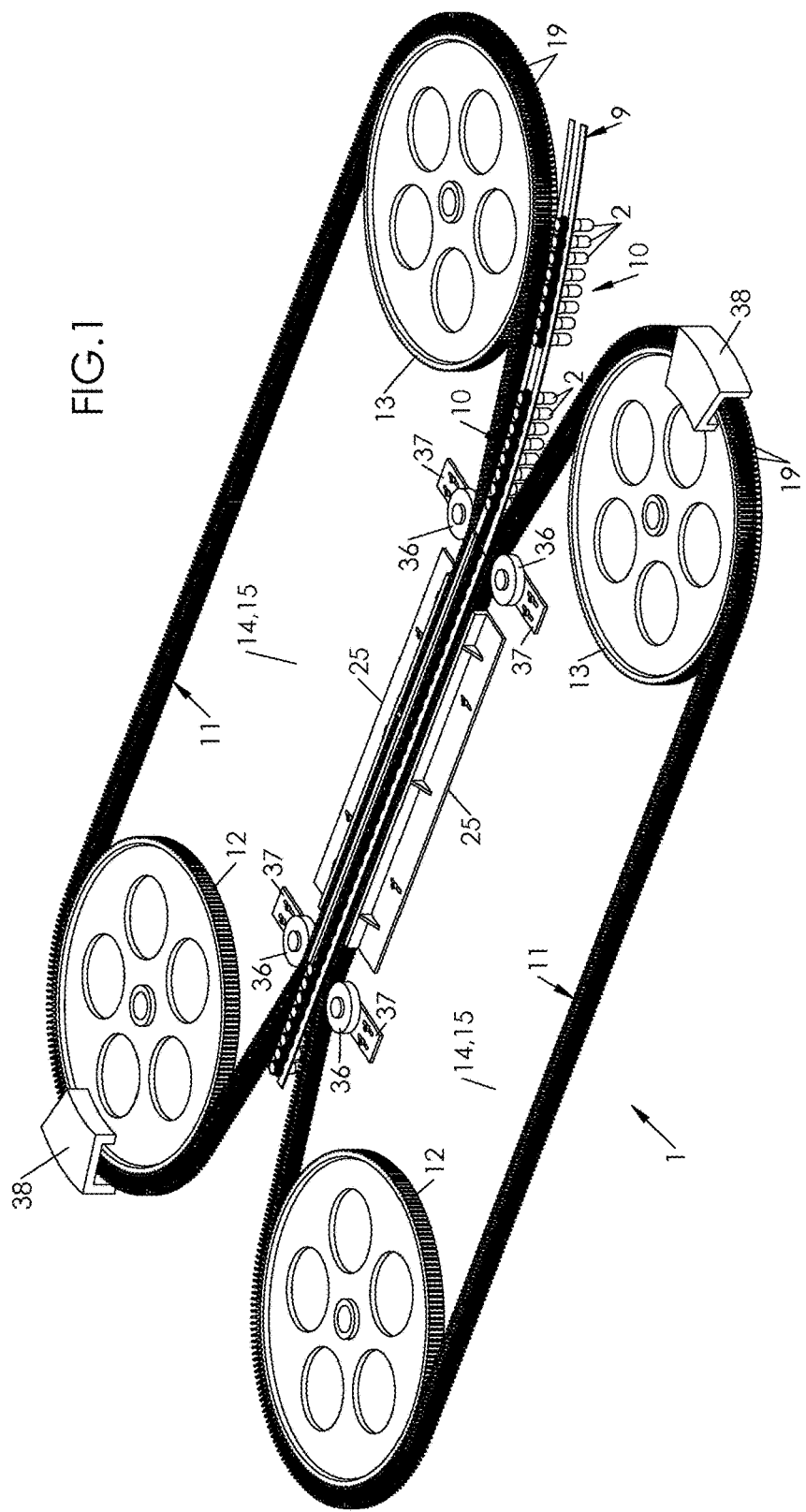

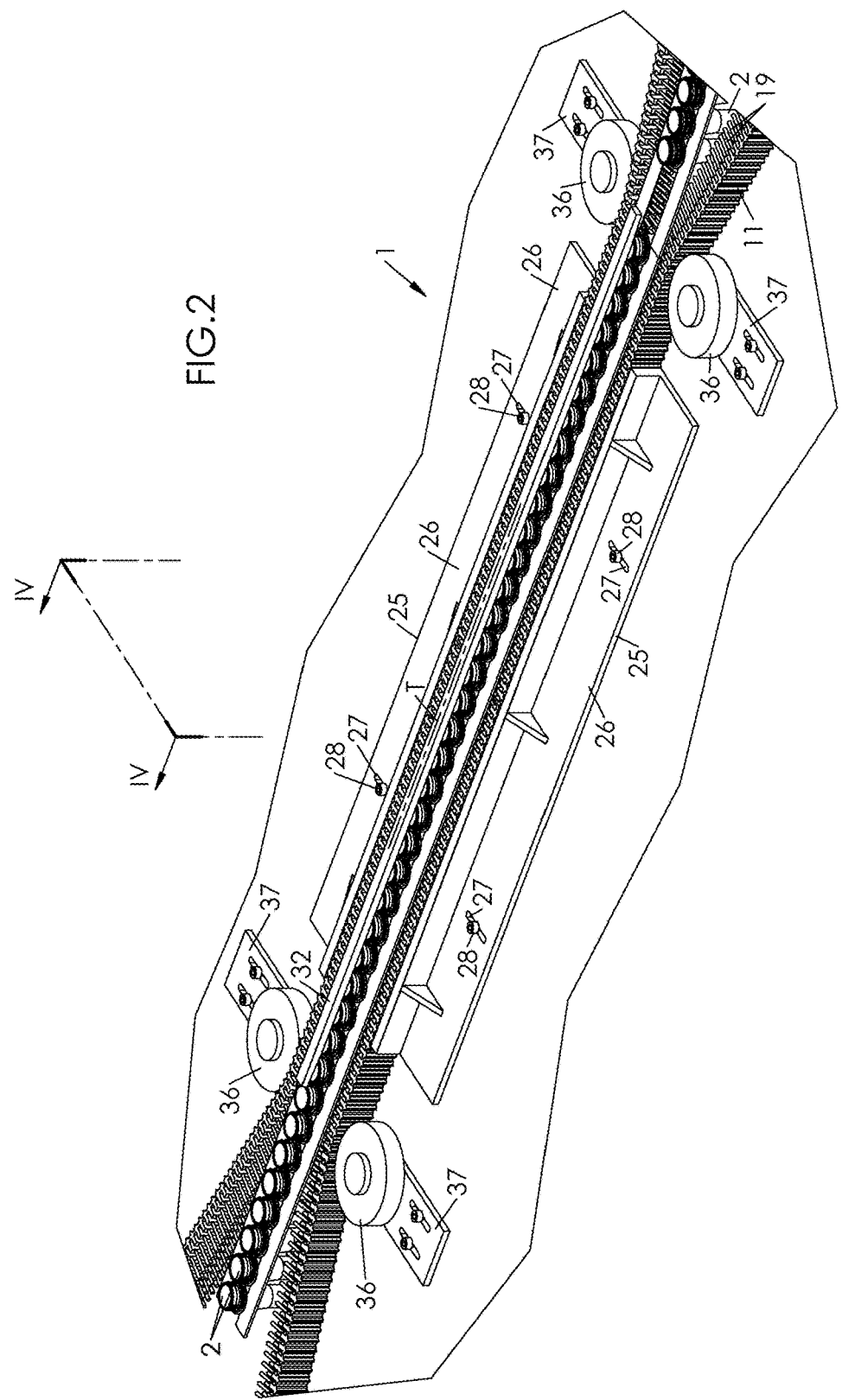

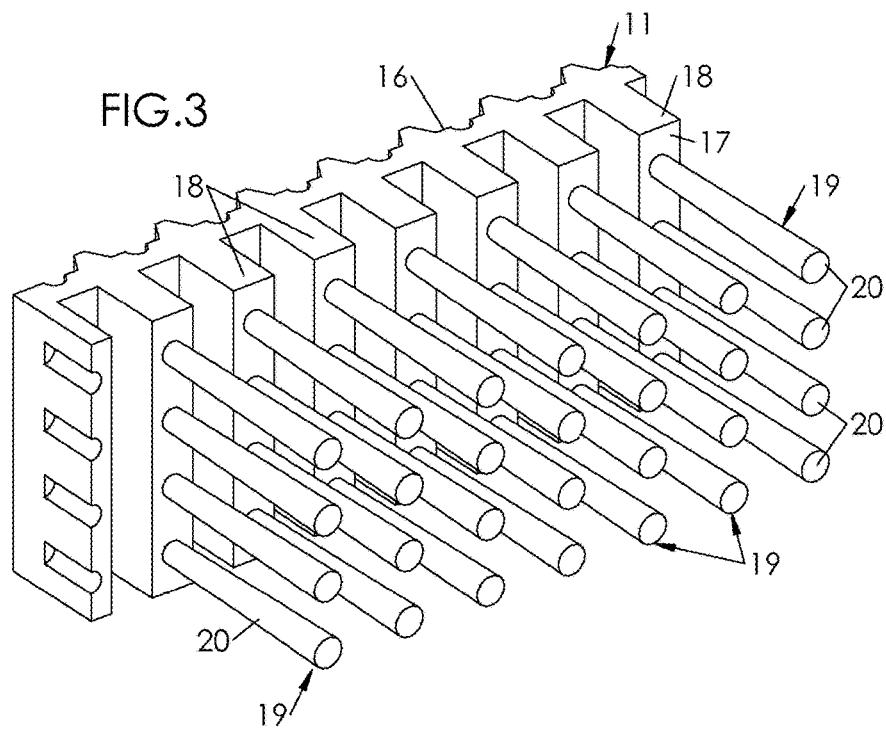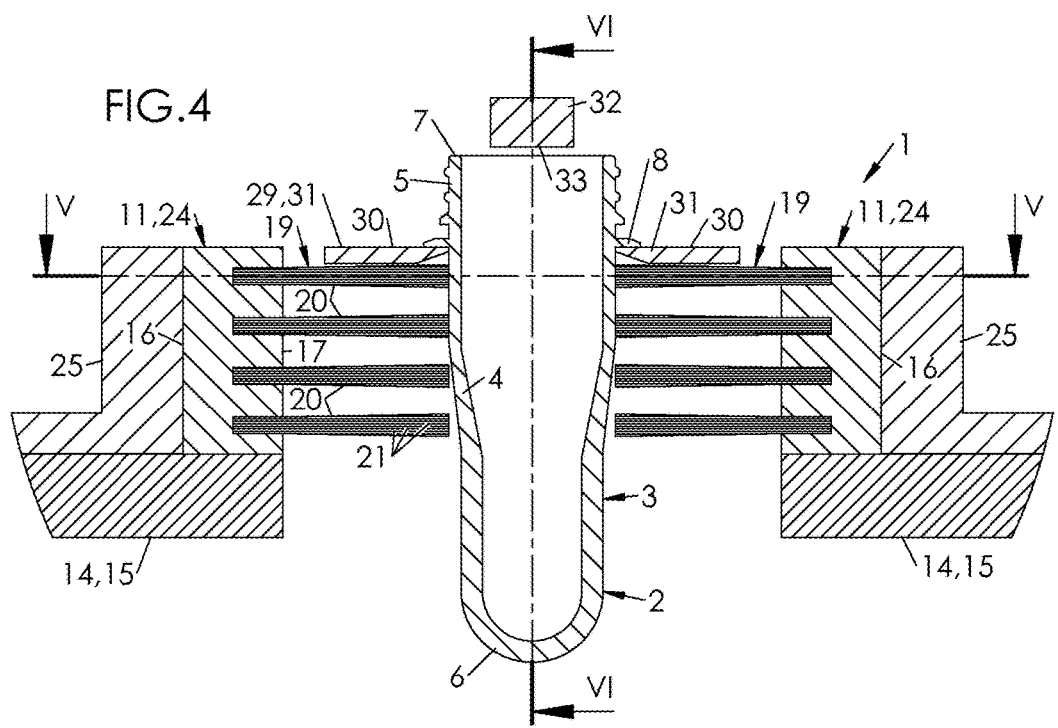

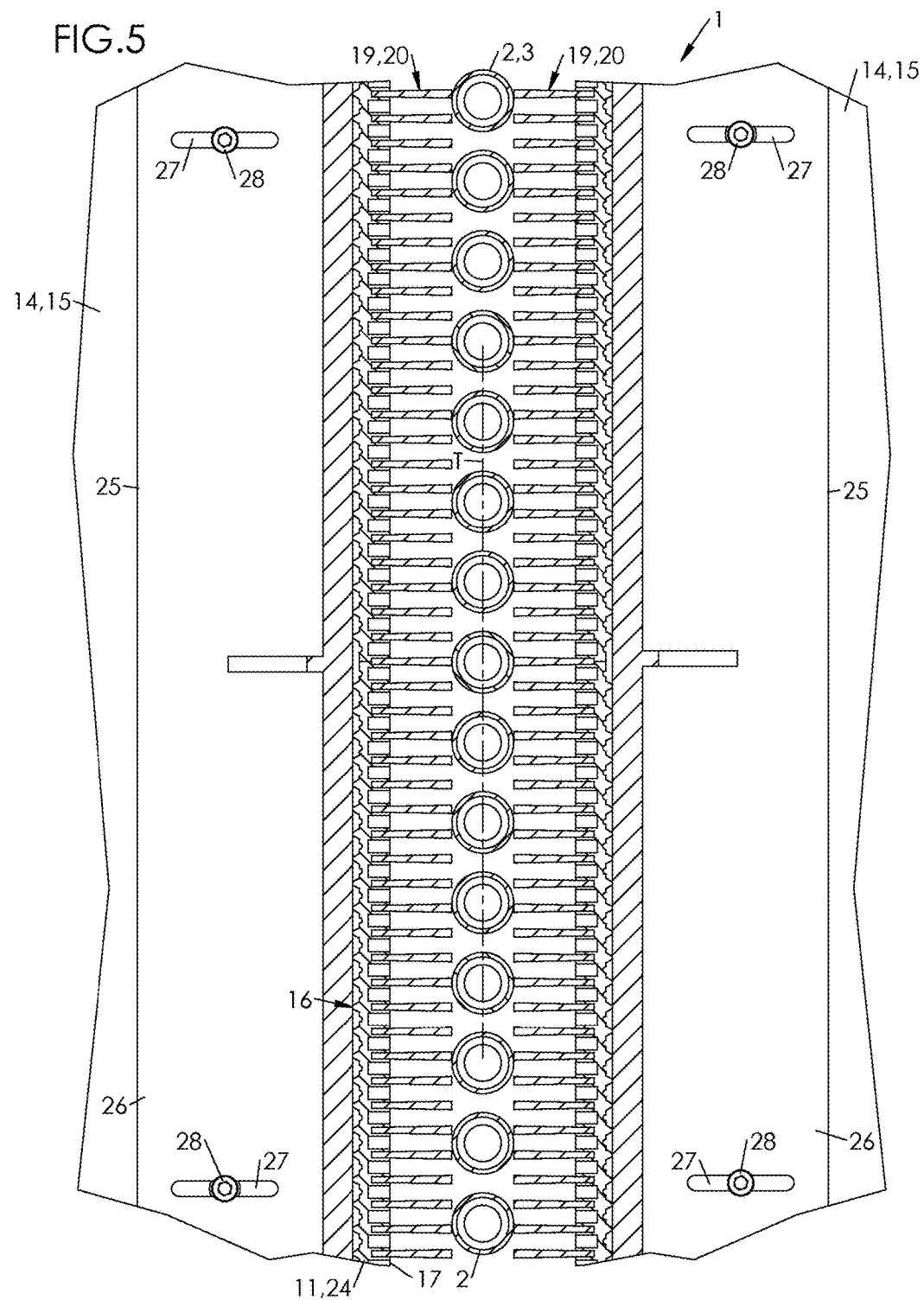

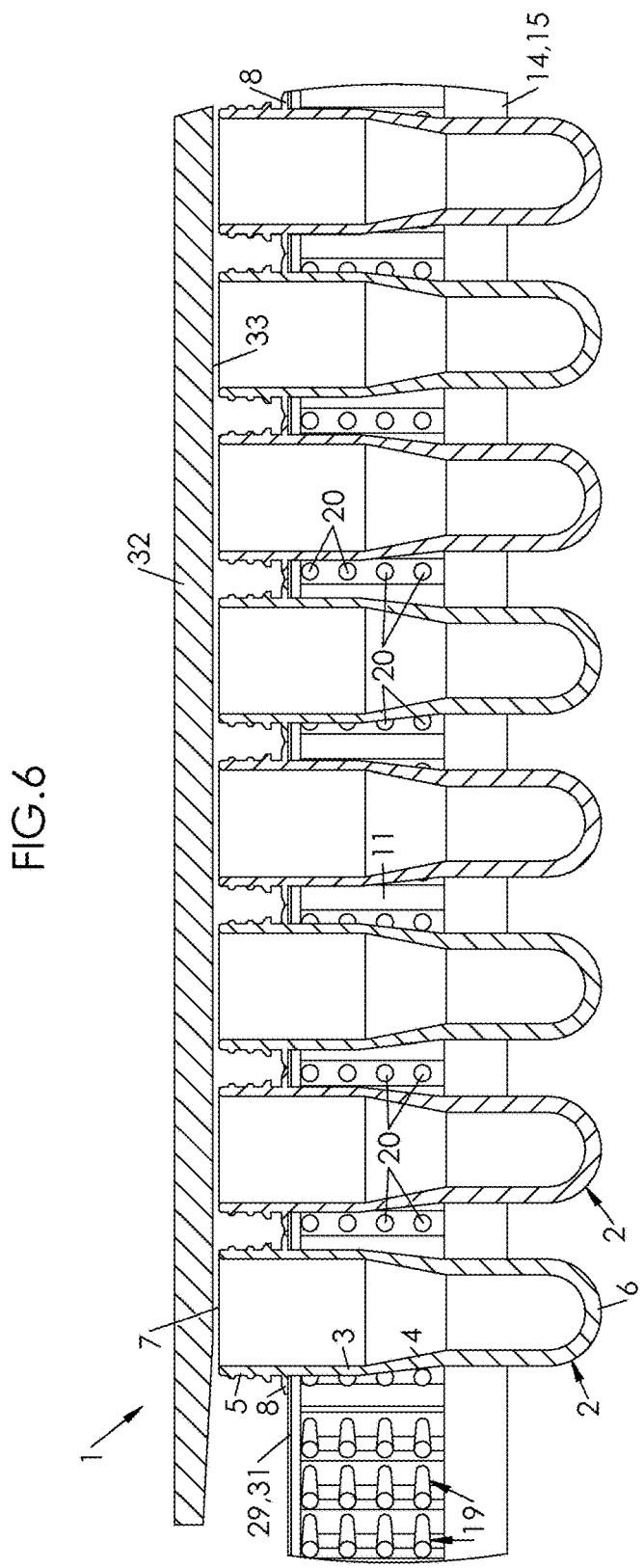

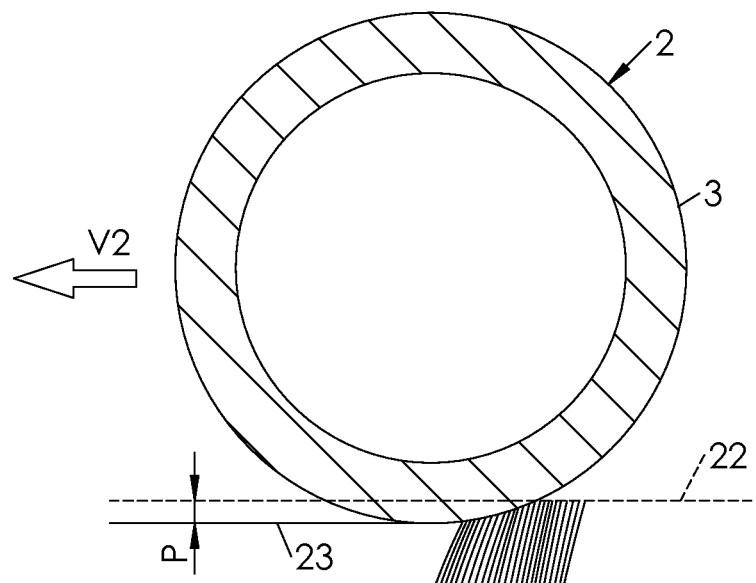
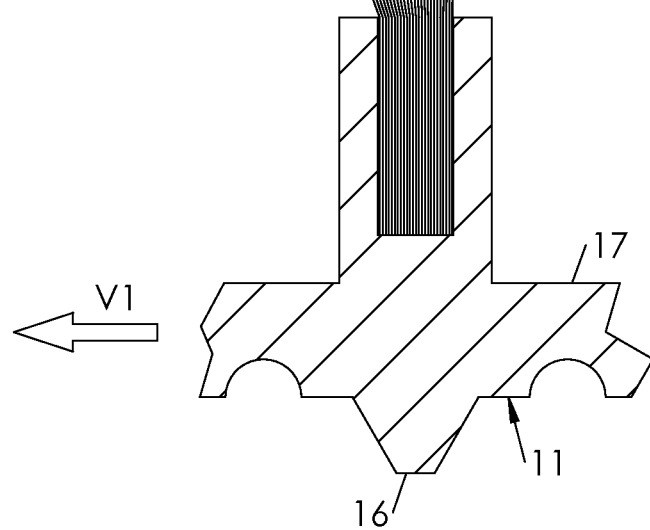
FIG.7

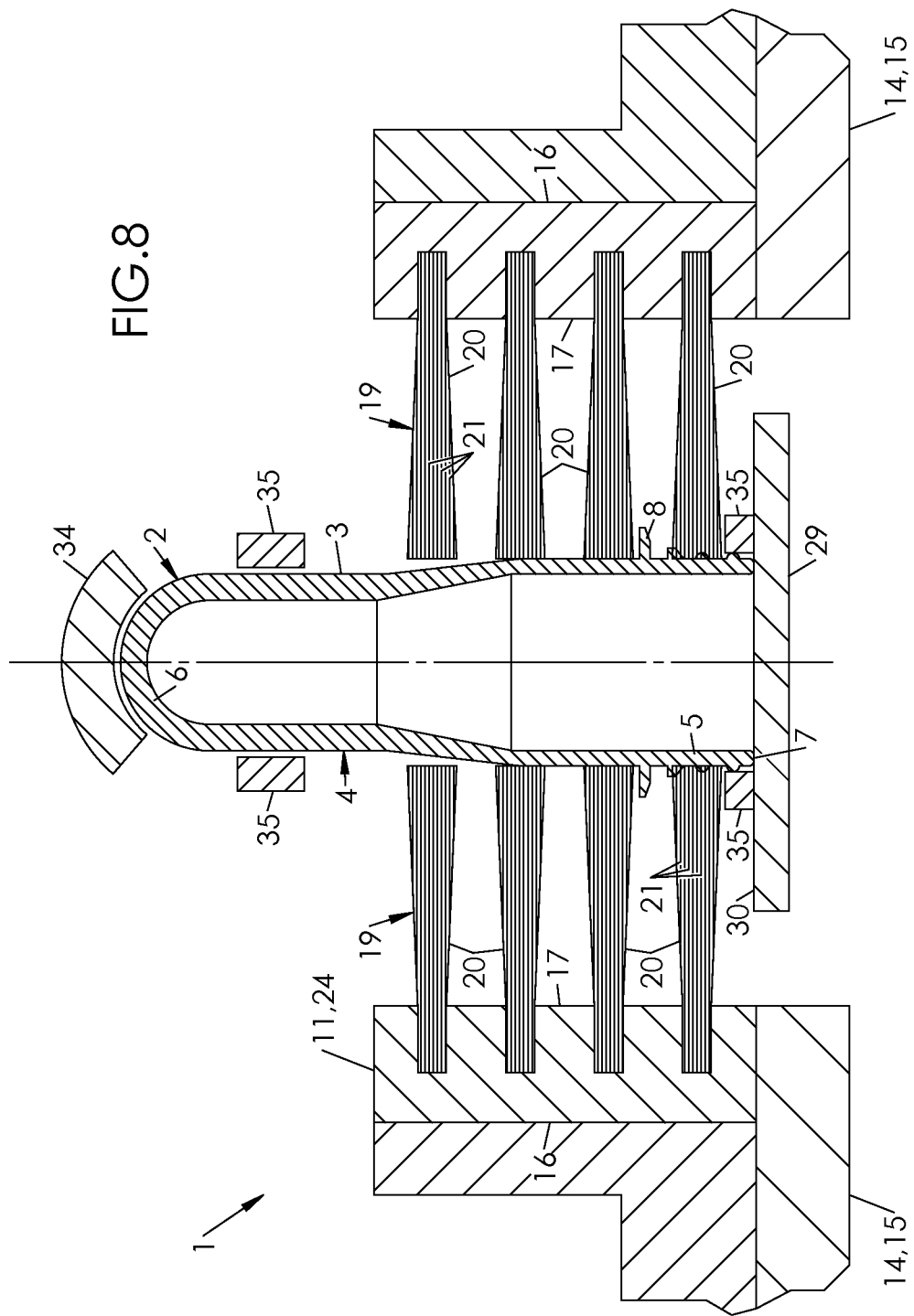

BRUSH CONVEYOR FOR TRANSPORTING PREFORMS

The invention relates to transporting articles, and more particularly to transporting preforms of containers made of plastic material such as PET.

BACKGROUND OF THE INVENTION

A preform generally comprises a tubular body that is closed, at a lower end, by a hemispherical bottom, and a neck, normally threaded, which extends the body from an upper end of the former. Most preforms are also provided with a collar that separates the neck from the body and that facilitates the handling of the preforms.

A cycle for manufacturing a container requires numerous operations for handling the preform from which the container is intended to be manufactured. From a bulk packing in a hopper (or a bowl, or any other bin), the preform is successively removed from the hopper, oriented (neck up or neck down), transferred to a heating unit (or oven), transported into it in a procession to undergo a thermal conditioning there, and then again transferred to a mold to be transformed there into a container by blow molding or stretch blow molding.

The transport speed of the preforms during such a cycle is not constant. In particular, the bulk packing of the preforms in the hopper or the bowl does not make it possible to feed the heating unit directly at its discharge. Consequently, between the hopper and the heating unit, an intermediate zone is provided where the preforms are temporarily accumulated to make possible a continuous feeding of the heating unit.

To perform this accumulation, a transport device is usually used that is equipped with an endless belt that carries the preforms along by rubbing, along a predetermined path (which can be linear at least in places).

The French patent FR 2 956 652 or its U.S. equivalent US 2012/312661 (SIDEL PARTICIPATIONS) describes a conveyor equipped with two endless belts, at least one of which has, in the area of an active part in contact with the preforms, a natural material consisting of leather.

This solution, which is actually currently used, is satisfactory to the extent that it makes it possible to perform the accumulation of the preforms effectively and without damaging them.

The rubbing against the preforms, however, causes, firstly, a rapid wear of the leather, which necessitates the frequent replacement of the belt.

Secondly, the rubbing produces a dust made of fine particles of leather that has a tendency to be deposited on the preforms and on the elements of the conveyor. Since the leather is a natural material, the resulting pollution is not hazardous, but it is not acceptable to allow the dust to accumulate on the conveyor, which consequently must undergo frequent cleanings.

SUMMARY OF THE INVENTION

A first object of the invention is to propose a method for transporting preforms that makes possible an effective accumulation of them.

A second object of the invention is to propose a method for transporting preforms that makes possible a greater resistance to wear.

A third object of the invention is to propose a transport method that makes possible a greater resistance to heat build-up.

For this purpose, a method for transporting preforms of containers made of plastic material is proposed, with each preform having a tubular wall that defines a body and a neck that are separated by a collar that projects radially from the wall, by means of a device comprising at least one endlessly circulating element that has an outer surface and that carries a series of brushes that extend projecting from the outer surface, able to come into contact with the preforms to carry them along by rubbing, along a path, this device further comprising a pair of rails that are spaced apart from one another, which together define at least one portion of the path of the preforms, with these rails having coplanar bearing surfaces for the hanging of the neck-up-oriented preforms by their collars, with the preforms being guided by means of a neck guide that extends perpendicular to the rails at a distance from them that is greater than or equal to a height of the neck of the preforms.

The brushes effectively carry along the preforms by rubbing from the end of their bristles. This rubbing produces little or no dust (and therefore little pollution), and the wear of the brushes remains slow when the material chosen (for example a Nylon®) is resistant to wear by rubbing.

At least one portion of the brushes can extend under the rails to come into contact with the body of the preforms.

The device can further comprise, on at least a portion of the path, a lateral guide against which the circulating element rests by an inner surface that is opposite to the outer surface.

Furthermore, each brush comprises, for example, a row of tufts of superposed bristles.

Also, each circulating element can comprise brushes over its entire length.

BRIEF DESCRIPTION OF THE DRAWINGS

Other objects and advantages of the invention will be brought out in the description of an embodiment, made below with reference to the accompanying drawings in which:

FIG. 1 is a top view in perspective of a device for transporting preforms equipped with belts provided with brushes, according to a first embodiment in which the preforms are transported neck-up;

FIG. 2 is a detail view, on a larger scale, of the device of FIG. 1;

FIG. 3 is a view in perspective showing a portion of a belt with brushes;

FIG. 4 is a transverse cutaway view of the transport device, along the cutting plane IV-IV of FIG. 2;

FIG. 5 is a horizontal cutaway detail view of the transport device, along the cutting plane V-V of FIG. 4;

FIG. 6 is a longitudinal cutaway detail view of the transport device, along the cutting plane VI-VI of FIG. 4;

FIG. 7 is a detail cutaway view, on a larger scale, illustrating the carrying along of a preform by the bristles of a brush of a belt;

FIG. 8 is a cutaway view similar to FIG. 4, illustrating a second embodiment of the transport device, in which the preforms are transported neck-down.

DETAILED DESCRIPTION OF THE PREFERRED EMBODIMENTS

Shown in FIG. 1 is a transport device 1 (or conveyor) for preforms 2 of containers made of plastic material, for example of polyethylene terephthalate (PET).

Each preform 2 has a tubular lateral wall 3 defining a body 4 and a neck 5. The body 4 is terminated, at an end opposite to the neck 5, by a hemispherical bottom 6. The neck 5 forms a rim 7 through which the container is intended to be filled. The neck 5 can be threaded to make possible the screwing-on of a cap after this filling.

According to an embodiment illustrated in the figures, each preform 2 further has an annular collar 8 that is used to facilitate the handling of the preforms 2 (and also the containers formed from these preforms 2).

In the example illustrated, the collar 8 extends at the junction between the body 4 and the neck 5, but this configuration is not limiting. In particular, the collar could extend at an end opposite to the bottom 6, so as to form the rim of the container. Likewise, the neck 5 is optional, so that the preform could be limited to a smooth body terminated at one end by a bottom and, at an opposite end, by a collar.

Furthermore, the collar 8 is not necessarily continuous; it can comprise several separate angular sectors.

Traditionally, the blank injection preforms 2 are initially stored in bulk in a bin such as a hopper, from which they are removed by known means (in a hopper, it involves, for example, an elevator; in a bowl, it involves, for example, a rotating plate associated with a spiral track) all while being oriented neck up or neck down. At the output of the bin, the preforms 2 are poured onto a linear support 9 (such as a track in the case of preforms 2 that are oriented neck up, as illustrated in FIG. 1) where they are moved by pushing one another. In certain critical zones (particularly at the junction between the bin and the support 9), systems (such as blowers) can be provided that are intended to prevent the jamming of preforms 2.

Preforms 2 that are poorly oriented at the output of the bin are reintroduced into the bin by means of locating pins, so that the flow of preforms 2 exiting from the container is not constant. Consequently, the preforms 2 are not necessarily aggregated on the linear support 9, with spaced-apart units 10 of preforms then being able to be formed, as illustrated in FIG. 1. In the configuration illustrated, where the support 9 is horizontal, an isolated unit 10 of preforms (on the right in FIG. 1) does not advance as long as a following unit 10 coming from the bin does not come to push it. In a variant, to facilitate the removal of the preforms 2 from the bin, the support 9 can be inclined.

The preforms 2 exiting from the bin are intended to be introduced into a heating unit there to undergo a thermal conditioning by exposure to sources of electromagnetic radiation (for example, infrared), so as to be softened for the purpose of being formed into containers by blow molding or stretch blow molding in a forming unit equipped with molds bearing the impression of the containers.

From the input of the thermal conditioning unit to the forming unit, the preforms 2 are picked up individually by gripping means (such as spindles or grippers). The initiation of the forming cycle, which must produce containers at a rate of several tens of thousands of units per hour, is not dependent upon the presence of preforms 2, so that in the absence of one or more preform(s) in the flow of preforms exiting from (and therefore entering into) the thermal conditioning unit, the forming unit runs empty in the mold(s) supposed to accommodate this (these) preform(s). There results a waste of energy and a reduction in productivity.

This is why a conveyor 1 as shown in FIG. 1 is inserted between the bin and the heating unit. It is an accumulation conveyor designed, from units 10 of preforms 2 that are spaced apart coming from the bin, to form a continuous flow of adjacent preforms 2 intended to be picked up individually.

The conveyor 1 comprises an endlessly circulating element 11. In the example illustrated, the circulating element 11 is a belt, i.e., a continuous band, but it could be a chain, made of a series of loops of links that are articulated relative to one another. Below, it is assumed that the circulating element 11 is a belt, which does not exclude another embodiment (in particular a chain). As illustrated, the belt 11 circulates on a pair of pulleys or toothed wheels, namely a driving wheel 12 and a follower wheel 13. Each wheel 12, 13 is mounted to rotate on a frame 14 comprising a table 15 that forms a horizontal bearing plane for the belt 11.

The belt 11 has an inner surface 16 and an outer surface 17 that are opposite. According to an embodiment illustrated in the figures, the inner surface 16 is notched to engage with the teeth of the wheels 12, 13. The outer surface 17 in turn forms a series of cogs 18. This configuration imparts a proper flexibility to the belt 11.

The belt 11 is driven to move at a speed denoted V1 in FIG. 7. The belt 11 carries a series of brushes 19 that extend projecting from the outer surface 17. In the example illustrated, each cog 18 carries a brush 19, which comprises a row of superposed tufts 20 of bristles 21.

The belt 11 is arranged to come into contact with the preforms 2 to carry them along by rubbing along a path T. Considering the flexibility of the belt 11, this path T is not necessarily flat; it could be curved as well. However, in the example illustrated, this path T is both flat and linear and defines a so-called longitudinal direction, which extends in an approximately horizontal plane (with, if necessary, a slight slope). Described as transverse is any direction that is both horizontal and perpendicular to the longitudinal direction.

The belt 11 is preferably positioned so that the plane 22 (shown in dotted lines in FIG. 7) swept by the ends of the bristles 21 is offset, toward the interior of the preforms 2, from the plane 23 (shown in solid lines in FIG. 7) swept by the portion of the body 4 of the preforms 2 that is closest to the belt 11. From this offsetting, termed pass depth of the brushes 19 and denoted P in FIG. 7, it results that the bristles 21 of each tuft 20, during the movement of the belt 11, rub against the lateral wall 3 of the preform 2. By their flexibility, the bristles 21 undergo, upon contact with the wall 3, a bending that puts the bristles 21 under tension and increases in this way the force exerted by each tuft 20 on the wall 3, tending to cause the preform 2 to move. According to a preferred embodiment, the pass depth P is between 0.5 and 3 mm, and, for example, on the order of 1 mm.

Since a sliding of the bristles 21 occurs on the wall 3, a portion of the kinetic energy of the belt 11 is dissipated at the interface between the bristles 21 and the lateral wall 3, so that the speed, denoted V2, of movement of the preforms 2 is less than the speed V1 of movement of the belt 11.

A single belt 11 that would entrain the preforms 2 by rubbing against them from only one side could be provided. In such a configuration, however, an appropriate rotation of the preforms 2 around their axis, which can reduce their speed V2 of movement, can occur.

For this reason, according to a preferred embodiment illustrated in FIGS. 1, 2, 4, and 5, the conveyor 1 comprises two similar belts 11, placed on both sides of the path T. More specifically, the belts 11 have, along the path T, parallel sides 24 (longitudinal in the example illustrated) to entrain together the preforms 2 by rubbing, along diametrically opposite meridians on the preforms 2. This configuration limits the risk of an appropriate rotation of the preforms 2 and provides a more effective transmission of the kinetic energy of the (or each) belt 11 to the preforms 2.

The material of the bristles 21 is advantageously selected so that the forces of rubbing against the lateral wall 3 are high enough to transmit effectively to the preforms 2 the kinetic energy of the belt 11, so that the heating caused by the rubbing remains measured (for the benefit of a better control of the thermal conditioning of the preforms 2), so that the wear of the bristles 21 by rubbing against the lateral wall 3 is nevertheless relatively slow, and so that the possible scratches on the lateral wall 3 are imperceptible. The polyamides, and more particularly Nylon®, provide all of these advantages. The slight wear of the bristles 21 guarantees a long service life for the (or each) belt 11.

Considering the relative flexibility of the (or each) belt 11, the bristles 21 have a tendency, under the action of their resting against the lateral wall 3 of the preforms 2, to transmit to the belt 11 a transverse force that, if this remained unimpeded, would have a tendency to cause it to bow and consequently to separate the brushes 19 from the preforms 2 and therefore to reduce the forces transmitted thereto.

Also, to maintain a certain transverse rigidity of the (or each) belt 11 along the path T and thus to maintain a relatively significant rubbing force, it is preferable to provide the conveyor 1 with a lateral guide 25, which extends over at least a portion of the path T of the preforms 2, and against which the belt 11 rests on its inner surface 16.

According to an embodiment illustrated in FIGS. 2, 4, and 5, the position of the guide 25 is transversely adjustable. For this purpose, a horizontal portion 26 of the guide 25 is provided with oblong holes 27 into which screws 28 are inserted for fastening the guide 25 onto the table 15. By unscrewing the screws 28, it is possible to move the guide 25 transversely. In this way, it is possible to adjust the pass depth P and therefore the rubbing force applied by the brushes 19 to the preforms 2. This adjustment also makes it possible to compensate over time for the wear of the bristles 21 to keep the pass depth P relatively constant.

As is seen in FIGS. 2, 4, and 8, the conveyor 1 comprises a stationary support 29 that defines a flat bearing surface 30 for the preforms 2.

According to a first embodiment, illustrated in FIGS. 4 and 6, the preforms 2, provided with a collar 8, are oriented neck up. The support 29 appears in the form of a pair of rails 31 that are spaced apart from each other. The rails 31 together define at least one portion of the path T of the preforms 2. The rails 31 have coplanar upper bearing surfaces 30, making possible the hanging, by their collars 8, of the preforms 2 oriented neck up. The spacing between the rails 31 is slightly greater than the under-neck diameter of the preforms 2. The play between the rails 31 and the body 4 of the preforms 2 is sufficient to make possible the sliding of the preforms 2 without jamming, all while being small enough to prevent the passage of the collar 8 and the fall of the preforms 2.

In this embodiment, at least one portion of the brushes 19 (all of the brushes 19 in the example illustrated in FIG. 4) extends under the rails 31 to come into contact with the body 4 of the preforms 2.

Another portion of the brushes 19 could, however, extend above the rails 31 to rub against the neck 5.

In this first embodiment, the conveyor 1 preferably comprises a neck guide 32 that extends perpendicularly to the rails 31 at a distance from them that is greater than or equal to a height of the neck 5 of the preforms 2, i.e., a gap is provided between the neck guide 32 and the rim 7 of preforms 2. This neck guide 32 has the function of preventing the preforms 2 from rising up and the collars 8 of the preforms 2 from overlapping, so as to keep the distance between two successive preforms 2 constant (and equal to the diameter of the collar 8). In the example illustrated, the neck guide 32 appears in the form of a bar having a rectangular cross-section, which has a flat lower surface 33 distant from the rim 7 of the preforms 2 by several tenths of millimeters (1 to 2 mm at most).

According to a second embodiment (illustrated in FIG. 8), the preforms 2 are oriented neck down (and where they can optionally be free of a collar, although having one in the example illustrated in FIG. 8). In this case, the support 29 appears, for example, in the form of a plate on which the preforms 2 rest on their rim 7. In this configuration, the brushes 19 extend above the plate 29 and rub against the body 4 and/or against the neck 5. In a variant, the support 29 could appear in the form of a pair of rails on which the preforms 2 would rest by their collars (when they are provided with them).

In this second embodiment, the conveyor 1 can comprise a bottom guide 34 that extends perpendicularly to the plate 29, at a distance from it that is greater than or equal to an overall height of the preforms 2. This guide 34 limits the risk of the tipping forward of the preforms 2 under the action of the rubbing forces caused by the brushes 2. This guide 34 can be movable to accompany the preforms along their path and thus again to limit the risk of tipping. In this case, the guide 34 can appear in the form of an endless circulating band mounted between two pulleys.

To prevent in addition any lateral tipping of the preforms 2, guide rails 35 can be provided, positioned on both sides of the body 4 and/or neck 5.

As is seen particularly in FIG. 1, the (or each) belt 11 can comprise brushes 19 over its entire length. The placement of the brushes 19 can be vertical or, as a variant, angled (i.e., the different tufts can be placed staggered). Further, the conveyor 1 can be equipped with tensioning rollers 36 to place the (or each) belt 11 under tension and thus to prevent the undulations in the strand 24 bordering the path T and to maintain a constant orientation there of the bristles 21, for the benefit of the effectiveness of the entrainment of the preforms 2. Each tensioning roller 36 is, for example, mounted on a stationary plate 37 in an adjustable manner transversely to the table 15 of the conveyor 1.

Various alternative or additional arrangements can be provided.

Firstly, the brushes 19 could be mounted on several independent superposed belts, which would circulate, for example, at different speeds so as to maintain a continual rubbing of the brushes 19 with the lateral wall 3 of the preforms 2.

Secondly, the conveyor 1 can be equipped, as illustrated in FIG. 1, with one or more device(s) 38 for cleaning (or decontaminating) the brushes 19, operating, for example, by suction, by exposure to ultraviolet light or to ionized air. The result is a decontamination of the conveyor 1 (and therefore of the preforms 2), and a conformity of it to the health standards in force.

Thirdly, the conveyor 1 can be equipped with at least one preform ejector, making it possible to remove from the flow of preforms circulating in the conveyor 1 any preform that would be poorly oriented and that would risk causing a blockage or an entangling of the preforms 2 along the path, which could damage or break at least one of the components of the conveyor 1. This ejector would appear, for example, in the form of a movable cross-section of the support 29, which would form a retractable hatch controlled by the detection of one or more poorly-oriented preforms.

The invention claimed is:

1. A method for transporting preforms (2) of containers, said preforms being of the type that are transformed into containers by blowing or stretch-blow molding, said preforms being made of plastic material, each one of said preforms having a tubular wall (3) that defines a body (4) and a neck (5) that are separated by a collar (8) that projects radially from the wall (3) by means of a device (1) that includes an endlessly-circulating element (11) that has an outer surface (17) and that carries a series of brushes (19) that extend projecting from the outer surface (17), structured to come into contact with the preforms (2) to entrain them by rubbing along a path (T), said device (1) also including a pair of rails (31) that are spaced apart from one another, and which together define at least one portion of the path (T) of the preforms (2), said rails (31) having coplanar bearing surfaces (30), the method comprising:
    hanging the preforms by the collars (8) of the preforms (2), oriented neck up, by means of said bearing surfaces; and
    guiding the preforms (2) by means of a neck guide (32) that extends perpendicularly to the rails (31) at a distance from the rails that is greater than or equal to a height of the neck (5) of the preforms (2),
    said guiding of the preforms by the neck guide preventing the collars of two successive preforms from overlapping.

2. The method (1) according to claim 1, wherein at least one portion of the brushes (19) extends under the rails (31) to come into contact with the body (4) of the preforms (2).

3. The method (1) according to claim 1, wherein the neck guide (32) is formed as a bar having a rectangular cross-section, which has a flat lower surface (33) that is distant from a rim (7) of the preforms (2) by several tenths of millimeters.

4. The method (1) according to claim 1, wherein the preforms (2) are entrained by means of two circulating elements (11) provided with brushes (19) and having, along the path (T), parallel strands (24) to entrain together the preforms (2) by rubbing.

5. The method (1) according to claim 1, wherein the circulating element (11), on at least a portion of the path (T), rests on a lateral guide (25) by an inner surface (16) opposite to the outer surface (17).

6. The method (1) according to claim 1, wherein each brush (19) comprises a row of tufts (20) of superposed bristles (21).

7. The method (1) according to claim 1, wherein each circulating element (11) comprises brushes (19) over its entire length.

8. The method (1) according to claim 2, wherein the neck guide (32) is formed as a bar having a rectangular cross-section, which has a flat lower surface (33) that is distant from a rim (7) of the preforms (2) by several tenths of millimeters.

9. The method (1) according to claim 2, wherein the preforms (2) are entrained by means of two circulating elements (11) provided with brushes (19) and having, along the path (T), parallel strands (24) to entrain together the preforms (2) by rubbing.

10. The method (1) according to claim 3, wherein the preforms (2) are entrained by means of two circulating elements (11) provided with brushes (19) and having, along the path (T), parallel strands (24) to entrain together the preforms (2) by rubbing.

11. The method (1) according to claim 2, wherein the circulating element (11), on at least a portion of the path (T), rests on a lateral guide (25) by an inner surface (16) opposite to the outer surface (17).

12. The method (1) according to claim 3, wherein the circulating element (11), on at least a portion of the path (T), rests on a lateral guide (25) by an inner surface (16) opposite to the outer surface (17).

13. The method (1) according to claim 4, wherein the circulating element (11), on at least a portion of the path (T), rests on a lateral guide (25) by an inner surface (16) opposite to the outer surface (17).

14. The method (1) according to claim 2, wherein each brush (19) comprises a row of tufts (20) of superposed bristles (21).

15. The method (1) according to claim 3, wherein each brush (19) comprises a row of tufts (20) of superposed bristles (21).

16. The method (1) according to claim 4, wherein each brush (19) comprises a row of tufts (20) of superposed bristles (21).

17. The method (1) according to claim 5, wherein each brush (19) comprises a row of tufts (20) of superposed bristles (21).

18. The method (1) according to claim 2, wherein each circulating element (11) comprises brushes (19) over its entire length.

19. The method (1) according to claim 3, wherein each circulating element (11) comprises brushes (19) over its entire length.

20. The method (1) according to claim 4, wherein each circulating element (11) comprises brushes (19) over its entire length.

21. A method for transporting preforms (2) of containers, said preforms being of the type that are transformed into containers by blowing or stretch-blowing, said preforms being made of plastic material, said method comprising:
    using a device (1) that includes an endlessly-circulating element (11) that has an outer surface (17) and that carries a series of brushes (19) that extend projecting from the outer surface (17), structured to come into contact with the preforms (2) to entrain them by rubbing along a path (T), said device (1) also including a pair of rails (31) that are spaced apart from one another, and which together define at least one portion of the path (T) of the preforms (2), said rails (31) having coplanar bearing surfaces (30);
    hanging the preforms by the collars (8) of the preforms (2), oriented neck up; and
    guiding the preforms (2) by means of a neck guide (32) that extends perpendicularly to the rails (31) at a distance from them that is greater than or equal to a height of the neck (5) of the preforms (2),
    wherein each one of said preforms has a tubular wall (3) that defines a body (4) and a neck (5) that are separated by a collar (8) that extends radially beyond an entire wall of the body of the preform.

* * * * *